March 3, 1931.  J. C. CROWLEY  1,795,077
VALVE INSIDES
Original Filed June 6, 1927

INVENTOR
John C. Crowley
BY
Kwis Hudson & Kent
ATTORNEYS

Patented Mar. 3, 1931

1,795,077

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE INSIDES

Original application filed June 6, 1927, Serial No. 196,676. Divided and this application filed May 19, 1928. Serial No. 278,926.

The present invention relates to valve insides which are adapted to be used with the valve stem of pneumatic tires or other inflatable air devices. This application is a division of the subject matter originally disclosed in a co-pending application filed June 6, 1927, Serial No. 196,676, valve insides.

An object of the invention is to provide a valve insides which is simple in its construction and which may be manufactured at low cost.

Additional objects and advantages will become apparent as the following detailed description proceeds.

Reference should be had to the accompanying drawing forming a part of this specification in which.

Figure 1:
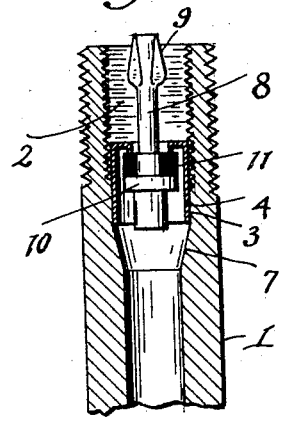
Fig. 1 is a sectional elevation of an embodiment of the invention.
Figure 2:
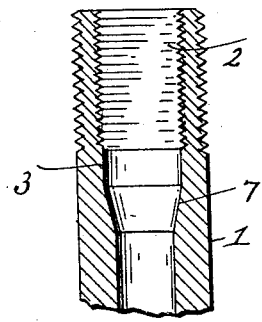
Fig. 2 is a detailed sectional elevation of the valve stem.
Figure 3:
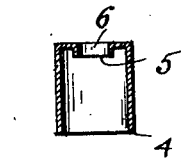
Fig. 3 is a detailed sectional elevation of a portion of the valve insides.

As is well known, it is customary to use in connection with pneumatic apparatus such, for instance, as pneumatic tires, air bags, etc., a valve stem into which the valve insides are adapted to be inserted. Ordinarily, such valve stem is interiorly bored and the outer end thereof provided with interior threads with which the threads of a standard valve insides are engaged so that the latter may be screwed into the valve stem.

However, in the present invention the valve stem 1 is not of standard construction, although it is provided with a central interior bore, the outer end of which may be threaded, if desired, as indicated at 2. Below the threaded portion there is a straight-walled portion 3 which is adapted to receive a pressed metal member 4. This member has a cylindrical body the upper end of which is closed except for a central opening 6, the periphery of which is flanged downwardly to form a truncated cone portion. In other words, this pressed metal member is substantially tubular with one end open and the other end closed, except for the central opening 6, while the truncated conical portion 5 projecting inwardly of the member provides a valve seat.

The member 5 is inserted within the valve stem under pressure. The cylindrical portion 4 engages with the wall 3 of the stem and being inserted under pressure effects a frictional engagement with the wall 3, serving to hold the member 4 in place. The central bore of the valve stem is formed of larger diameter at its upper end than at its lower end, and such ends are connected by a tapered portion 7, whereby the member 4 may be inserted under pressure into the valve stem until it engages with the tapered portion 7 thereof and the frictional engagement thus increased and a substantially perfect air seal between the member 4 and the valve stem effected with a metal-to-metal contact.

Within the member 4 is a valve pin 8, the the outer end of which is provided with extensions 9, while the inner end of the pin has an annular flange 10 upon which is supported a packing 11. The packing 11 is in position to engage with the inner edge of the conical portion 5 which forms an effective seat for the packing. When the valve pin 8 and the parts associated therewith are assembled with respect to the member 4, which member has been inserted under pressure within the valve stem, the valve insides form a self-containing valve structure. When the valve is in use and the tire or other article in connection with which it is used is inflated, the air pressure acting against the flange 10 and the end of the valve pin 8 will be sufficient to cause the packing 11 to impinge against its seat on the conical portion 5, thus effecting an air seal and preventing the escape of air. So long as the air pressure exerts its influence in the manner above described, the valve insides will remain in closed position. In inflating, the winged end 9 of the pin will be depressed by means usually provided as a part of inflating devices, so that the packing 10 will likewise be depressed from its seat and held in position to permit of the passage of air through the valve and into the article being inflated. Since the valve pin 8 extends beyond the member 4 and the connected portions of the pin are beyond the air passage thence through the member 4, such struck-out or connected portions will not in any way interfere with the passage of air through the central bore of the member 4 and of the valve stem when the valve pin is depressed. This construction enables a maximum area in the central bore of the member 4 for the passage of air so that there will be a minimum of restriction and retardation of such passage. The valve insides are simple in construction, being made of but few parts, which offer a simple problem so far as manufacturing production is concerned and one which involves low cost besides being, at the same time, capable of ready assembly and disassembly.

Although a preferred embodiment of the invention has been disclosed and described herein it should be understood that the same is not to be limited thereto but is susceptible of such modifications and adaptations as fall within the scope of the appended claims.

Having thus described my invention, I claim:

1. A valve insides comprising a member adapted to be inserted under pressure upon the inside of a valve stem and to be frictionally held therein, said member being stamped from sheet metal into substantially tubular form having one end open and the other end closed except for a central opening, means adjacent said central opening for providing a valve seat, a pin extending through said central opening, a packing member associated with the said valve pin and adapted to cooperate with the said seat, and means upon the end of the valve pin beyond the opening in said member to prevent the pin from dropping through said opening.

2. A valve insides comprising a member adapted to be inserted under pressure upon the inside of a valve stem and to be frictionally held therein, said member being stamped from sheet metal into substantially tubular form having one end open and the other end closed except for a central opening, said opening having its periphery formed into an inwardly extending truncated conical portion serving as a valve seat, a pin extending through said central opening, a packing member associated with the said valve pin and adapted to cooperate with the said valve seat, and means upon the end of the valve pin beyond the opening in said member to prevent the pin from dropping through said opening.

3. A valve insides comprising a member adapted to be secured upon the inside of a valve stem, said member being a hollow cylinder having a relatively thin wall throughout its length and adapted to engage with the wall of the bore of the valve stem, said member being open at one end and closed at the other end except for a central opening, said central opening having its periphery flanged inwardly of said member to form a valve seat, a pin extending through said central opening, a packing member associated with said valve pin and adapted to cooperate with said valve seat to seal said central opening, and means upon the end of the valve pin beyond said central opening to prevent the pin from dropping therethrough.

In testimony whereof, I hereunto affix my signature.

JOHN C. CROWLEY.